(12) United States Patent
Foltin (10) Patent No.: US 9,404,630 B2
(45) Date of Patent: Aug. 2, 2016

(54) METHOD AND DEVICE FOR OPERATING A HEADLAMP FOR A MOTOR VEHICLE

(71) Applicant: Robert Bosch GmbH, Stuttgart (DE)

(72) Inventor: Johannes Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/912,744

(22) Filed: Jun. 7, 2013

(65) Prior Publication Data

US 2013/0335984 A1  Dec. 19, 2013

(30) Foreign Application Priority Data

Jun. 15, 2012  (DE) .......................... 10 2012 210 157

(51) Int. Cl.
*B60Q 1/00* (2006.01)
*F21S 8/10* (2006.01)
*B60Q 1/14* (2006.01)

(52) U.S. Cl.
CPC .............. *F21S 48/10* (2013.01); *B60Q 1/1423* (2013.01); *B60Q 2300/052* (2013.01)

(58) Field of Classification Search
CPC ....................................................... F21S 48/10
USPC .......... 362/464, 465, 466, 512, 538, 539, 523
See application file for complete search history.

(56) References Cited

U.S. PATENT DOCUMENTS

| 5,780,719 | A  | * | 7/1998  | VanDam      | 73/29.01  |
|-----------|----|---|---------|-------------|-----------|
| 8,810,653 | B2 | * | 8/2014  | Nagaoka et al. | 348/148 |
| 8,811,668 | B2 | * | 8/2014  | Dierks et al. | 382/103 |
| 2005/0219852 | A1 | * | 10/2005 | Stam et al. | 362/466 |
| 2007/0147055 | A1 | * | 6/2007  | Komatsu     | 362/464 |
| 2008/0180966 | A1 | * | 7/2008  | Louvet et al. | 362/514 |
| 2008/0263807 | A1 | * | 10/2008 | Yan et al.  | 15/250.12 |
| 2010/0123402 | A1 | * | 5/2010  | Chen        | 315/156 |
| 2010/0213846 | A1 | * | 8/2010  | Thomas      | 315/82 |
| 2012/0242832 | A1 | * | 9/2012  | Datta et al. | 348/148 |
| 2012/0275172 | A1 | * | 11/2012 | Mizuno      | 362/464 |
| 2014/0169010 | A1 | * | 6/2014  | Imaeda      | 362/460 |

FOREIGN PATENT DOCUMENTS

| DE | 10 2006 045 525 A1 | 4/2008  |
| DE | 10 2008 013 603 A1 | 9/2009  |
| DE | 10 2008 031 947 A1 | 10/2009 |
| DE | 10 2008 025 808 A1 | 12/2009 |
| DE | 10 2008 060 564 A1 | 6/2010  |
| DE | 10 2009 024 129 A1 | 12/2010 |

* cited by examiner

*Primary Examiner* — Evan Dzierzynski
*Assistant Examiner* — Matthew Peerce
(74) *Attorney, Agent, or Firm* — Maginot, Moore & Beck LLP (57) ABSTRACT

A method for operating a headlamp for a motor vehicle, which can be operated in at least two illumination states, comprises: detecting at least one influencing variable, which can influence a future change of mode of the headlamp from one of the illumination states to another of the illumination states; detecting a time profile of the influencing variable; detecting a control signal that is intended to cause a change of mode of the headlamp from a current illumination state to another of the illumination states; and controlling the mode of the headlamp depending on the control signal, wherein the change of mode of the headlamp is delayed depending on the time profile of the influencing variable.

20 Claims, 5 Drawing Sheets

METHOD AND DEVICE FOR OPERATING A HEADLAMP FOR A MOTOR VEHICLE

This application claims priority under 35 U.S.C. §119 to patent application no. DE 10 2012 210 157.8, filed on Jun. 15, 2012 in Germany, the disclosure of which is incorporated herein by reference in its entirety.

The disclosure relates to a method for operating a headlamp for a motor vehicle, which can be operated in at least two illumination states. The disclosure also relates to a corresponding control and evaluation unit and a corresponding computer program product.

BACKGROUND

In the field operating of headlamps for motor vehicles, operating headlamps in a low beam mode or a full beam mode is generally known.

DE 10 2008 031 947 A1 describes a method for determining a headlight range setting of a vehicle. The method includes determining a position of the vehicle relative to an environment of the vehicle and determining a headlight range setting using the determined position of the vehicle. Further, a setting time that is required to carry out an automatic headlight range setting on the vehicle to the determined headlight range setting is determined, and a change in the position of the vehicle during the setting time is predicted. A corrected illumination range setting is determined by combining the headlight range setting determined using the position of the vehicle and the change in the position predicted during the setting period.

DE 10 2008 013 603 A1 describes a light module for an illumination device of a motor vehicle with a plurality of semiconductor light sources disposed in a matrix. A projection lens arrangement is disposed in the beam path of the light emitted by the semiconductor light sources that projects the light to achieve a desired light distribution on a highway in front of the motor vehicle.

SUMMARY

According to one aspect of the disclosure a method is provided for operating a headlamp for a motor vehicle, which can be operated in at least two illumination states, with the steps:
  detecting at least one influencing variable, which can influence a future change of mode of the headlamp from one of the illumination states to another of the illumination states,
  detecting a time profile of the influencing variable,
  detecting a control signal, which is intended to cause a change of the mode of the headlamp from a current illumination state to another of the illumination states, and
  controlling the mode of the headlamp depending on the control signal, wherein the change of the mode of the headlamp is delayed depending on the time profile of the influencing variable.

According to another aspect of the disclosure, a control and evaluation unit is provided for operating a headlamp for a motor vehicle, which can be operated in at least two illumination states, which is also designed to detect at least one influencing variable, which can influence a future change of a mode of the headlamp from one of the illumination states to another of the illumination states, to detect a time profile of the influencing variable, to detect a control signal that is intended to cause a change of the mode of the headlamp from a current illumination state to another of the illumination states, and to control the operation of the headlamp depending on the control signal, wherein the change of the mode of the headlamp is delayed depending on the time profile of the influencing variable.

The new method can be particularly advantageously implemented using a computer program that comprises a program code that is designed to implement such a method if the program code is implemented on a control and evaluation unit of a motor vehicle.

According to the new method, the time profile of the influencing variable is used to delay the change of the mode of the headlamp. In other words, a history of the influencing variable is detected and preferably evaluated. The change of mode of the headlamp is then delayed depending on said history or on a result of the evaluation.

It is advantageous here that an unnecessary or erroneous change of mode of the headlamp can be reduced or entirely prevented. This results in increased driving safety for the driver of the motor vehicle and for other drivers in other motor vehicles that are located in a working range of the headlamp. This is owing to the fact that e.g. very frequent or unnecessary changes of the mode of the headlamp are prevented, whereby a more comprehensible behavior for the changes of mode of the headlamp for the driver and for the other drivers is achieved. Consequently, irritation of the driver and of the other drivers is reduced by fewer and more comprehensible changes of the mode. The method and the control and evaluation unit are particularly advantageous if the change of mode of the headlamp takes place automatically in the motor vehicle by means of control electronics, e.g. by means of a high beam assistant. In this case an automatic change proposed by the control electronics is checked and either validated or adapted by the new method and/or the new control and evaluation unit.

The headlamp is preferably understood here to be a front headlamp of the motor vehicle. In particular, a front headlamp that is designed for standard street illumination and preferably for fog-free weather. This type of headlamp is most often used, so that the safety-related improvement of the control of said front headlamp enables the greatest safety gain for road traffic.

The new method controls headlamps with at least two different illumination states. As already mentioned, a plurality of different headlamp concepts with different illumination states is known from the prior art, of which three headlamp concepts are shown as examples here, which are particularly well suited for use together with the new method and/or the new control and evaluation unit.

As a first headlamp concept, headlamps are known that can be operated in at least two illumination states, a full beam mode and a low beam mode. Typically, the change of mode of the headlamp takes place in a discrete manner, wherein the high beam illumination is switched on or off alternatively or additionally to the low beam illumination.

As a second headlamp concept, headlamps are known that have headlight range adjustment. Said headlamps can typically be operated with the headlight range adjustment in a plurality of illumination states. The plurality of illumination states arises from a first illumination state with a minimum possible illumination range, a second illumination state with a maximum possible illumination range and at least one third illumination state whose illumination range lies between the minimum possible illumination range and the maximum possible illumination range. Typically, such headlamps are continuously or quasi-continuously controllable in their illumination range.

As another headlamp concept, headlamps are known that comprise light sources in a matrix arrangement and/or a plurality of optical lenses in a matrix arrangement. Said headlamps can typically project complex illumination patterns in a working range of the headlamp. Hereby the illumination of specific ambient areas can be very selectively increased, reduced or omitted. Different illumination patterns are considered as different illumination states for these headlamps.

As influencing variables, variables are especially suitable that can make a change of the illumination state probable or necessary. Preferably, said variable can be detected using measurement equipment. For example, instantaneous values of general control signals, headlamp-relevant control signals and/or other data signals that can be detected in the motor vehicle can be used as influencing variables. Alternatively or additionally, ambient measurement values that have characteristics of the environment can also be used as influencing variables. Said features can e.g. be a location, a time, traffic, traffic information or information about the existence and/or location of other motor vehicles in the surroundings of the motor vehicle.

According to the new method, said influencing variables are detected over a time interval, whereby the time profile of the influencing variable is detected. This can e.g. take place by means of recording or storing the influencing variable over a time interval. Preferably, the time interval is a predefined time interval, which e.g. can be determined in advance by experiments and provided in a memory. Alternatively or additionally, detected influencing parameters can be stored in a ring memory, which gives the time interval. Alternatively or additionally, the time interval can be dynamically adapted depending on suitable parameters. It is also conceivable that the influencing parameters are weighted over time. Consequently, it is possible to make the dependency of the delay on selected regions of the time profile of the influencing variable more dependent or less dependent relative to other regions of the time profile. The adaptability of an analysis of the time profile, which takes place by weighting the regions of the time profile to a specific application case, is especially advantageous here. The application case can e.g. conceivably be a different assessment of influencing parameters for urban travel, overland travel and/or expressway travel.

The new method also detects a control signal. Said control signal is intended to cause the change of mode of the headlamp. The control signal can be received e.g. from a manual light control or an automatic light controller, preferably a high beam assistant. For example, the control signal can signal a desired switching to high beam, a desired switching to low beam, a desired illumination range change and/or a desired illumination pattern change. It is advantageous here that the new method and/or the new control and evaluation unit can cooperate with already existing systems. This enables the simple and efficient integration of the new method and/or the new control and evaluation unit in existing systems. A simple and efficient retrofit of existing motor vehicles and assemblies for motor vehicles is also enabled. Overall, indirect control of the mode of the headlamp by the control signal thus takes place. It is also conceivable to directly control the operation of the headlamp by the control signal if there is to be a zero delay depending on the time profile.

The delay itself takes place here depending on the time profile, wherein the delay e.g. can be defined by a fixed time period. Said fixed time period can e.g. be determined in advance by experiment and provided in a memory. In a preferred embodiment the delay is defined by a dynamic time period, which is determined depending on the time profile of the influencing variable.

Overall, the new method and the new control and evaluation unit enable in an advantageous manner changes of the mode of the headlamp to be controlled in an understandable manner for the driver of the motor vehicle and for drivers of other motor vehicles and hence enable traffic safety to be enhanced.

In one embodiment the change of mode is delayed by preventing the start of the change in comparison to a delay-free change by at least a first time period.

In said embodiment the change, which is signaled by the control signal, is shifted in time. The start of the delay-free change is hereby the start that would occur if the control signal were to directly control the change. Furthermore a delay-free change is understood to be a notional change of mode of the headlamp that would occur if the control signal were to control the change directly. The delay according to the new method and/or the new control and evaluation unit thus takes place in addition to time delays of the change relative to the detection of the control signal for technical reasons, such as e.g. signal transition times, calculation times and/or switching times.

It is advantageous here that the control signal does not have to be changed. The delay of the change can be effected by a time delay of the entire control signal. This leads to a particularly simple and efficient implementation of the new method and the new control and evaluation unit.

It is further conceivable that the start and hence the change are entirely prevented. This can occur e.g. if the start of the change is delayed until another first control signal that signals a reversion of the change is received within the first time period. In another embodiment the change of mode is delayed by reducing the speed of the change relative to the speed of a delay-free change for at least a second time period.

In said embodiment the change that has been signaled by the control signal is itself changed. Here the speed of the delay-free change is the speed of the change that would occur if the control signal were to directly control the change. Furthermore, a delay-free change is understood to be a notional change of mode of the headlamp that would occur if the control signal were to control the change directly. The delay thus takes place in addition to time delays of the change relative to the detection of the control signal caused for technical reasons, such as e.g. signal transition times, calculation times and/or switching times.

It is advantageous here that a characteristic of the change can be adapted based on the notional change. For example, the change can be slowed uniformly from start to finish compared to the notional change. Alternatively or additionally, it is conceivable that the delay itself can be changed over the duration of the change. For example, the change can be delayed normally relative to the notional change at the start and can be delayed ever more or less at the end. This enables the start of the change to take place particularly early, without the disadvantages of a delay-free change arising. This leads to a particularly flexible and safe implementation of the new method and the new control and evaluation unit. This type of delay is particularly advantageous if the change relates to a preferably continuous headlight range adjustment and/or a change of illumination pattern. Here intermediate states between the illumination state at the start of the change and the illumination state at the end of the change can be used.

In another embodiment a state variable of the headlamp is detected as an influencing variable.

In said embodiment the delay occurs depending on the time profile of the state of the headlamp. It is advantageous here that state variables of the headlamp within the motor vehicle can be detected very simply, because these are typically already made available in the motor vehicle. For example, via a data memory within the vehicle or via a data bus.

E.g. the control signal or a different headlamp-related control variable is suitable as a state variable. It is also conceivable to sense a state of the headlamp using a sensor, wherein the state variable is determined depending on measurement data of the sensor. An optical sensor is preferably used as the sensor, such as e.g. a photo sensor or an image sensor.

In another embodiment a change of mode of the headlamp from one of the illumination states to another of the illumination states is detected as the state variable.

In said embodiment the delay occurs depending on the time profile of previously occurring and detected changes. In other words, the delay takes place depending on a change history of the headlamp itself. Preferably, the change is delayed or delayed more if a large number of changes have occurred in the time interval under consideration. Alternatively or additionally, the change is preferably delayed with a null delay or is delayed less if a smaller number of changes have occurred in the time interval under consideration. The specific dimensioning of said numbers can e.g. take place by experimentation in relation to a specific application case.

It is also conceivable to distinguish between different types of changes when detecting the state variable or to take into account only one determined type of change as a state variable. Various types can be e.g. switching to main beam, switching to low beam, an increase of the illumination range, a reduction of the illumination range or a change of illumination pattern.

Overall, the delay preferably acts, depending on the time profile of the influencing variable, similarly to a low pass with dynamic filter characteristics that depend on the changes themselves. It is advantageous here that changes of mode of the headlamp can be particularly simply detected, distinguished and evaluated, whereby a robust and efficient implementation of the method and the control and evaluation unit is enabled.

In another embodiment a duration of at least one of the illumination states is detected as the state variable.

In said embodiment the delay occurs depending on the duration of at least one illumination state over the time interval. In other words, the delay can take place depending on a time component of the at least one illumination state in the time interval.

It is preferably provided that only one type of illumination state is taken into account when detecting the state variable. Various types can be e.g. a full beam mode, a low beam mode, an increased illumination range, a reduced illumination range or a defined illumination pattern. It is particularly preferred if the full beam mode or the increased illumination range is taken into account.

Preferably, the change is delayed or delayed more if there is a large time component of the illumination state, especially the low beam mode or the reduced illumination range, in the time interval under consideration. Alternatively or additionally the change preferably is delayed with a delay of zero or is delayed less if there is a small time component of the corresponding illumination state in the time interval under consideration. The specific dimensioning of the time component can take place e.g. by experimentation in relation to a specific application case.

It is hereby advantageous that the duration of illumination states of the headlamp can be particularly easily detected, distinguished and evaluated, whereby a robust and efficient implementation of the method and the control and evaluation unit is enabled.

It is particularly preferred if both a change of mode of the headlamp and also a duration of the illumination state are detected as a state variable. A particularly robust and reliable implementation of the method and the control and evaluation unit are thus enabled.

In a further embodiment at least one ambient measurement value for the surroundings of the motor vehicle is detected as an influencing variable.

In said embodiment the delay occurs depending on the time profile of ambient measurement values that are preferably produced by means of a sensor. Proximity sensors are preferably used as sensors, such as e.g. an image sensor, a stereo image sensor pair, a radar sensor, an ultrasound sensor and/or a Lidar sensor. Furthermore, in this case the ambient measurement value for the image sensor is preferably understood to be at least one image. Accordingly, the profile of the ambient measurement value is understood to be a video.

It is advantageous here that the delay can be made dependent on a time profile of features and/or events of the surroundings. For example, daytime or night time; pitch, yaw and/or roll characteristics of the motor vehicle; road signs, traffic control signals, highway markings; road users, such as e.g. pedestrians, oncoming and/or preceding motor vehicles; obstructions and/or urban regions can be used as features. Furthermore, their changes over time or their movements are taken into account for the delay of the change. It is advantageous here that a particularly adaptable and accurate delay of the change can be implemented depending on the profile of the ambient measurement values.

Alternatively or additionally it is conceivable to use a telecommunications means or a positioning system to detect the ambient measurement value. This can e.g. be a GPS system, a mobile Internet system, a communications system between at least two motor vehicles and/or a communications system between the motor vehicle and an infrastructure.

In another embodiment a probability for an appearance of a different vehicle in a working range of the headlamp is determined from the time profile of the ambient measurement value, wherein the control is delayed depending on the probability.

In said embodiment the delay occurs depending on the probability. The probability can thereby be defined as e.g. a probability value. Alternatively or additionally, the profile of the ambient measurement value can be compared with predefined reference profiles. Probability values can then be assigned to the predefined reference profiles, which have e.g. been determined in advance by experimentation. The reference profiles themselves can likewise be determined by experimentation or even by training, if the method is used in combination with a training system, such as e.g. a neural network. Once there is sufficient agreement between the profile of the ambient measurement value and at least one of the predefined reference profiles, then a probability can be assigned to the profile of the ambient measurement value.

Preferably, the video is used in said embodiment as the profile of the ambient measurement. The large amount of ambient information and features that can be evaluated is advantageous here, wherein a prediction of future traffic situations takes place, which enables particularly good timing for the delay. The selection of the features to be used can then take place very specifically depending on a specific application case.

E.g. a corona effect can be used as such a feature, which exists if the motor vehicle and an oncoming motor vehicle are obscured relative to each other by an obstruction in the respective direction of travel. In other words, if an emerging light beam is detected in the profile of the ambient measurement value when traveling at night over an obstruction, such as a hill, then it is to be assumed with high probability that in the near future another vehicle will appear in the working range of the headlamp. Thus particularly good timing can be achieved and hence a particularly reliable delay can be implemented before or when the other vehicle appears. Consequently, unnecessary and irritating changes are also avoided. This is particularly because, as the time interval from detection of the light beam until an appearance of the other vehicle is typically too short to switch to high beam in said time period, because very brief and hence irritating beam dipping would be necessary.

In another embodiment the control is delayed depending on changes, durations and/or frequencies at least of parts of the time profile of the influencing variable.

In said embodiment the profile of the influencing variable is analyzed in order to adapt the delay to the profile.

Changes in the profile can e.g. be switching edges in the control signal or even a high level of image dynamics in the video recording. A high level of image dynamics is understood here to mean a plurality of relevant image changes during the time interval under consideration, as produced e.g. by a plurality of oncoming motor vehicles or by a plurality of street lights.

Duration is preferably understood here to mean the duration of a specified state of the influencing variable in the time interval. It is particularly preferred if an average duration in the time interval in which the specified state of the influencing variable has remained uninterrupted is determined as the duration. For example, for which average time period the headlamp has been operated in the time interval in full beam mode without interruption.

Frequencies are preferably understood here as frequencies of change. A frequency analysis can thus take place with a known statistical means, whose result then defines the delay. Said frequencies can e.g. be derived using frequencies of change or switching frequencies in the control signal or a frequency of recognized road users.

It is particularly preferred if e.g. statistical investigations of the dependency between the influencing variable and a noise perception of the driver take place in advance. A mathematical model for the dependency of the delay on the influencing variable can then be particularly well determined therefrom. Finally, the mathematical model can define the dependency of the delay on the influencing variable.

It is understood that the above-mentioned and yet to be explained features are not only able to be used in the respectively stated combination, but also in other combinations or on their own, without departing from the framework of the present disclosure.

BRIEF DESCRIPTION OF THE DRAWINGS

Example embodiments of the disclosure are illustrated in the figures and are explained in detail in the following description. In the figures.

DETAILED DESCRIPTION

Figure 1:
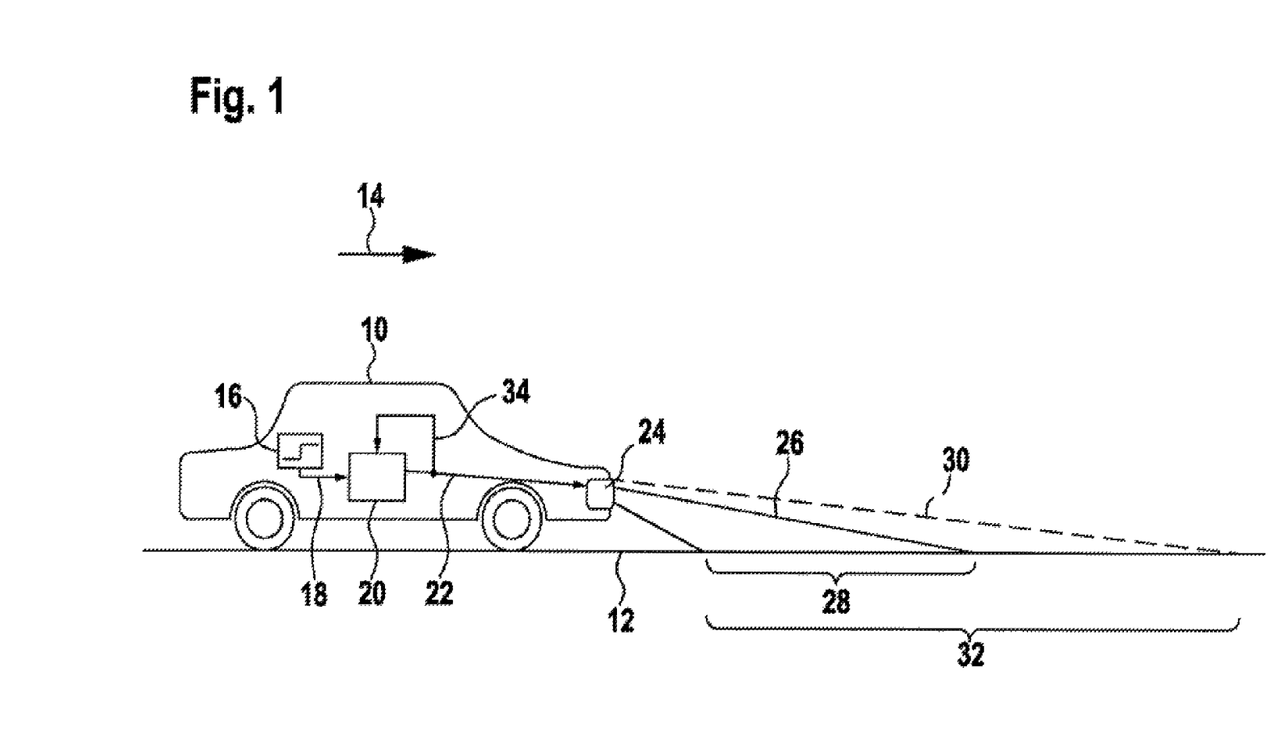
FIG. 1 shows a first motor vehicle with a control and evaluation unit that detects a state variable of a mode of a headlamp as an influencing variable.

In FIG. 1 a motor vehicle in its entirety is referred to by the reference number 10. The motor vehicle 10 is moving on a street 12 in the direction of an arrow 14.

The motor vehicle 10 comprises a signal generator 16, which can produce a first control signal. The signal generator 16 is a high beam assistant in this case, which produces the first control signal that is intended to automatically switch over between a high beam mode or a low beam mode automatically. In other exemplary embodiments the signal generator 16 can alternatively or additionally cooperate with a switching device that has to be operated manually by a driver in order to produce the first control signal.

The first control signal is passed via a signal path 18 to a control and evaluation unit 20. The control and evaluation unit 20 produces a second control signal, which is passed on via a signal path 22 to a headlamp 24. The headlamp 24 can be operated here in two different illumination states, i.e. the low beam mode and the full beam mode. The second control signal thereby causes a change from one of the illumination states into the respective other illumination state. The low beam mode is represented by a first light cone 26 that illuminates a first section of highway 28 of the highway 12. The full beam mode is represented by a second light cone 30, which illuminates a second section of highway 32 of the highway 12, wherein the second section of highway 32 includes the first section of highway 28.

In other exemplary embodiments headlamps can also be used that comprise more than two illumination states, e.g. headlamps with a headlight range adjustment or with variable illumination patterns. In said exemplary embodiments a continuous or quasi-continuous change of illumination of the section of highway 28 into the illumination of the section of highway 32 can take place. In addition, in said exemplary embodiments there is a low beam mode if the section of highway 28 is at least substantially illuminated. In addition, in said exemplary embodiments there is a full beam mode if the section of highway 32 is at least substantially illuminated.

The second control signal controls the illumination states of the headlamp 24 directly. It is thus a measure of the operation of the headlamp 24 and consequently a state variable of the headlamp 24. Thus the second control signal from the signal path 22 is detected by the control and evaluation unit 20 as an influencing variable via a signal path 34.

The control and evaluation unit 20 records the profile of the second control signal for a fixed time interval. The profile already recorded at the point in time of reception of the first control signal is evaluated by the control and evaluation unit 20. The first control signal is then delayed depending on a result of the evaluation.

In the illustrated exemplary embodiment a change from low beam mode into full beam mode is delayed by storing the first control signal and outputting it as a second control signal via the signal path 22 after the expiry of a first time period. The duration of the first time period is thereby dependent on the result of the evaluation.

In other exemplary embodiments in which a continuous or quasi-continuous change of the illumination of the section of highway 28 into the illumination of the section of highway 32 can take place, the first control signal can be detected by the control and evaluation unit 20 and can be changed depending on the result of the evaluation so that the speed of change of the mode of the headlamp 24 itself can be decreased.

Figure 2:
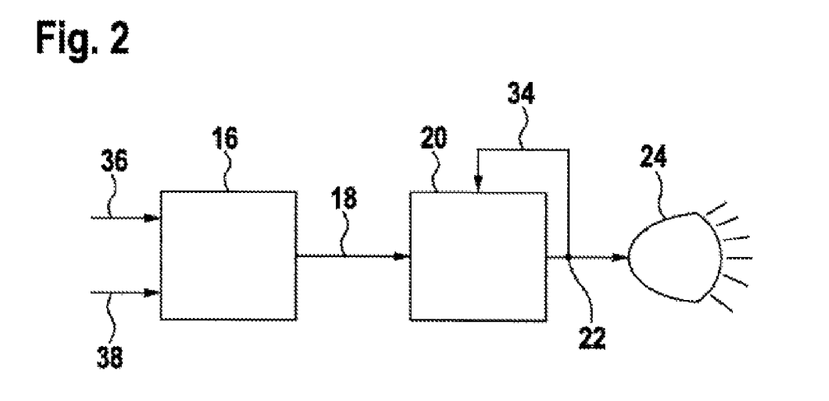
FIG. 2 shows a block diagram of components from FIG. 1.

FIG. 2 shows a block diagram of assemblies of the motor vehicle 10 from FIG. 1 for controlling the headlamp 24. In addition, two signal paths 36 and 38 are shown, via which the signal generator 16 can detect information. The signal generator 16 is here a high beam assistant. It receives via the signal path 36 information about other road users and via signal path 38 information about the speed of the motor vehicle 10 itself. The signal generator 16 produces the first control signal depending on said information.

Figure 3:
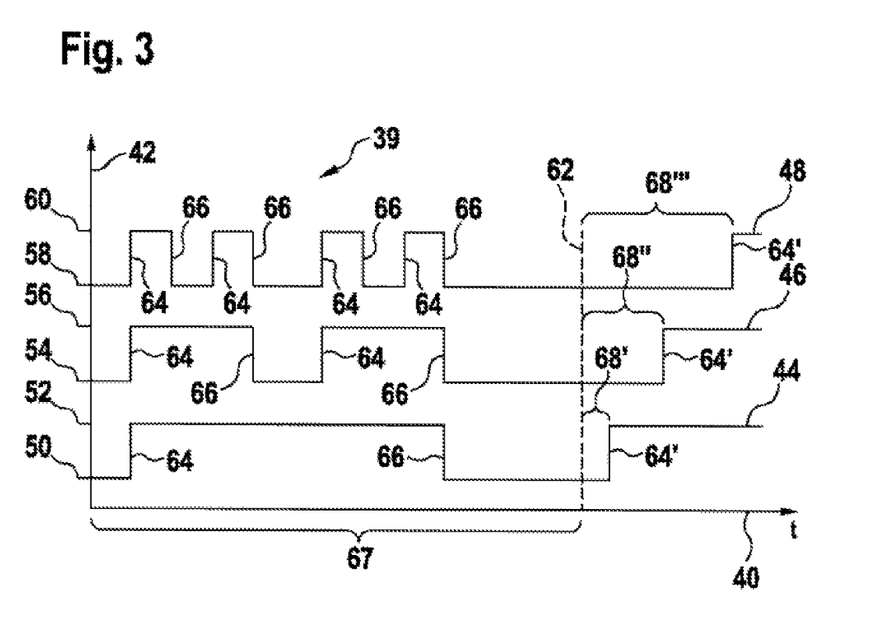
FIG. 3 shows schematic profiles of state variables of the headlamp, which are delayed differently.

FIG. 3 shows a diagram 39 with an abscissa 40 and an ordinate 42. The abscissa 40 describes the time. The ordinate 42 describes different illumination states. Within the diagram 39 three different curves 44, 46 and 48 of illumination states of the headlamp 24 from FIG. 1 are shown.

The value of the ordinate 42 that is referred to by reference number 50 describes a low beam mode for the curve 44 of the illumination states of the headlamp 24. The value of the ordinate 42 that is referred to by the reference number 52 describes a full beam mode for the curve 44 of the illumination states of the headlamp 24. The value of the ordinate 42 that is referred to by the reference number 54 describes a low beam mode for the curve 46 of the illumination states of the headlamp 24. The value of the ordinate 42 that is referred to by the reference number 56 describes a full beam mode for the curve 46 of the illumination states of the headlamp 24. The value of the ordinate 42 that is referred to by the reference number 58 describes a low beam mode for the curve 48 of the illumination states of the headlamp 24. The value of the ordinate 42 that is referred to by the reference number 60 describes a full beam mode for the curve 48 of the illumination states of the headlamp 24.

In addition, in the diagram a point in time 62 is shown. At said point in time a detection of the first control signal by the control and evaluation unit 20 takes place. Furthermore, changes 64 and 66 of the mode of the headlamp 24 can be recognized. The change 64 describes high beam switching of the headlamp 24 in each case and the change 66 describes low beam switching of the headlamp 24 in each case.

A time profile of the mode of the headlamp 24 is detected and evaluated for each curve 44, 46 and 48 over a time interval 67. The time interval 67 has a predefined magnitude, which extends in this case from the point in time zero to the point in time 62. By evaluating the profiles, i.e. those parts of the curves 44, 46 or 48 within the time period 67, a first time period is defined for each delay, said time periods being referred to here by the reference numbers 68', 68" or 68''' corresponding to the curves 44, 46 and 48. The change 64' following the first control signal is then delayed relative to the point in time 62 according to the respective first time periods 68', 68" or 68'''.

In the illustrated cases the evaluation takes place in such a way that only a small delay occurs for a small number of changes 64 and 66 in the time interval 67 and for a high average period from the changes 64 to the changes 66. In addition, it is designed so that a long delay occurs for a large number of changes 64 and 66 and for a short average period from the changes 64 to the changes 66 in the time interval 67.

The time profile of the curve 44 has exactly one change 64 and one change 66, wherein the period between the changes 64 and 66 is relatively long. Thus the change 64' is only delayed by a short first time period 68'.

The time profile of the curve 46 has two changes 64 and two changes 66, wherein the average period from the changes 64 to the changes 66 is shorter than in the time profile of the curve 44. There are thus a larger number of changes 64 and 66 than in the time profile of the curve 44. The change 64' is thus delayed by a longer first time period 68" than in the curve 44.

The time profile of the curve 48 has four changes 64 and four changes 66, wherein the average period between the changes 64 and 66 is shorter than in the time profile of the curve 46. There are thus also a larger number of changes 64 and 66 than in the time profile of the curve 46. The change 64' is thus delayed by a still longer first time period 68''' than in the curve 46.

In other exemplary embodiments the time profiles of the operating states of the headlamp 24 in the time interval can be evaluated in relation to their frequencies, especially switching frequencies. The delay can thus be adapted to the frequencies according to the above cases. Preferably, it is then delayed by a longer first time period 68''' if a higher frequency is detected than is given by the time profile of the curve 48. Furthermore, it is preferably delayed by a correspondingly shorter first time period 68' if a lower frequency is detected than is given by the time profile of the curve 44.

Figure 4:
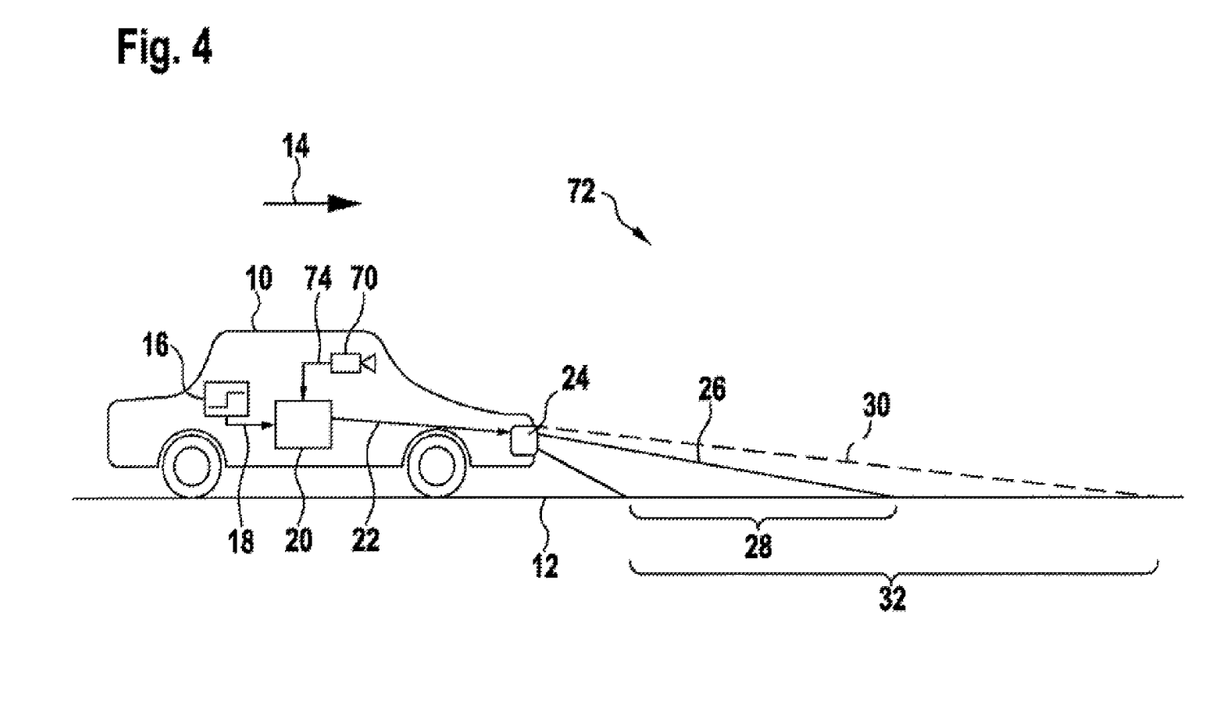
FIG. 4 shows a second motor vehicle with a controller, which detects an ambient measurement value as an influencing variable.

FIG. 4 shows the motor vehicle 10 from FIG. 1 with the difference that the motor vehicle 10 comprises a camera 70 that records an area of the surroundings 72 of the motor vehicle. As a further difference, ambient measurement values are produced by the camera 70, which are received by the control and evaluation unit 20 via a signal path 74 as influencing parameters.

The control and evaluation unit 20 records the time profile of the ambient measurement values for a fixed time interval as video. The video already recorded at the point in time of reception of the first control signal is evaluated by the control and evaluation unit 20. The first control signal is then delayed depending on a result of the evaluation. The evaluation takes place in this case by detecting and evaluating features in the video.

In a preferred exemplary embodiment, the state of the headlamp 24 itself is evaluated as features in the profile of the ambient measurement values.

In another particularly preferred exemplary embodiment, an appearance of oncoming and/or preceding other vehicles is evaluated as features in the profile of the ambient measurement values. The evaluation can take place in said exemplary embodiments according to the procedure described in FIG. 3, wherein the frequency and/or duration of feature changes define the delay. The number of oncoming other vehicles and their duration within the time interval 67 are especially suitable as frequency and duration.

In the illustrated exemplary embodiment, a change from a low beam mode to a full beam mode is delayed by storing the first control signal and outputting it as a second control signal via the signal path 22 after a first time period has elapsed. The duration of the first time period depends on the result of the evaluation.

In other exemplary embodiments the first control signal is detected by the control and evaluation unit 20 and depending on the result of the evaluation is changed in such a way that the speed of the change of the mode of the headlamp 24 itself is reduced.

Figure 5:
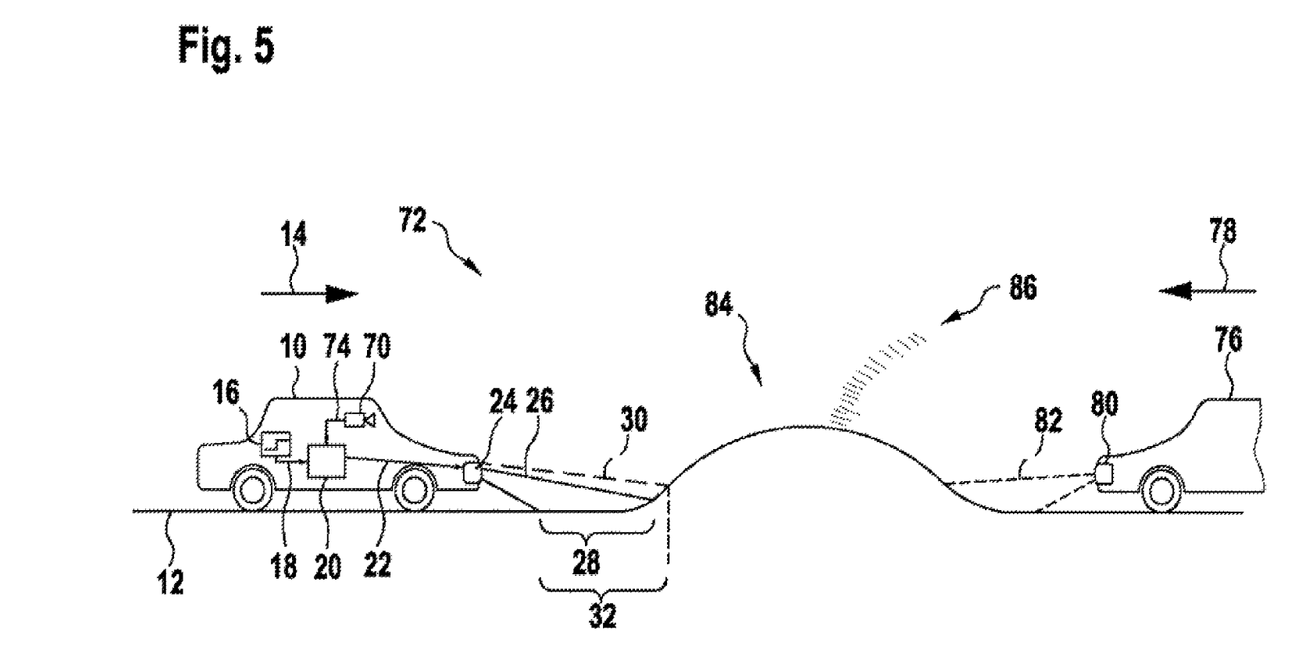
FIG. 5 shows the motor vehicle from FIG. 4, wherein a probability of an appearance of another vehicle is determined.

FIG. 5 shows the motor vehicle 10 from FIG. 4. In addition, an oncoming other vehicle 76 is illustrated that is moving on the highway 12 in an opposite direction of an arrow 78 to the motor vehicle 10. The other vehicle 76 is only partly illustrated here for clarity. It comprises a headlamp 80 that produces a light cone 82 in order to illuminate a section of highway.

The motor vehicle 10 and the other vehicle 76 are visually separated from each other by an elevation of the highway 84.

Especially at night a ray of light 86, which forms a corona effect, occurs indirectly because of the light cone 82. Said ray of light 86 is detected in the surroundings 72 by the camera 70.

During evaluation of the profile of the ambient measurement values, the control and evaluation unit uses said ray of light 86 as a feature for a probability of an appearance of the other vehicle 76 in a working range 30 of the headlamp 24. The probability is assessed as high here when detecting the light beam 86. Thus the change of mode of the headlamp, in this case switching to high beam, is significantly delayed. A short switching to high beam of the headlamp 24, which would then have to be rapidly followed by a change to low beam of the headlamp 24 if the other vehicle 76 appears in the working range 30 of the headlamp 24, is thereby prevented.

Figure 6:
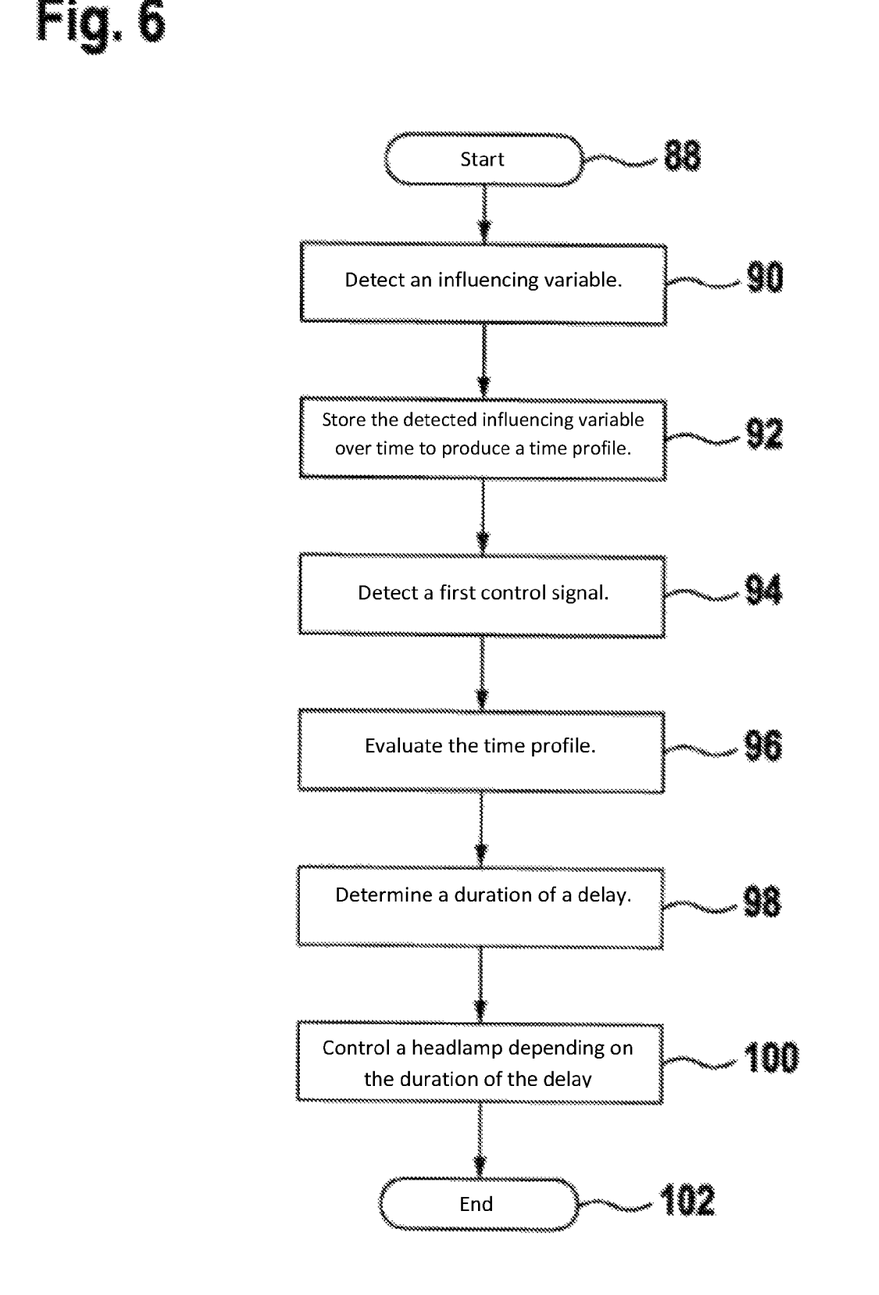
FIG. 6 shows a flow diagram for a preferred exemplary embodiment of the new method.

FIG. 6 shows a flow diagram of an exemplary embodiment of a method for operating the headlamp 24 for the motor vehicle 10, which can be operated in at least two illumination states 26 and 30.

The method begins with a starting step 88.

In another step 90 an influencing variable is detected by the control and evaluation unit, which can influence a future change of mode of the headlamp 24 from one of the illumination states to another of the illumination states.

In another step 92 the detected influencing variable is stored by the control and evaluation unit 20 over a time interval, so that a time profile of the influencing variable is provided.

In another step 94 the first control signal is detected by the control and evaluation unit 20.

In another step 96 the time profile of the influencing variable is evaluated and an evaluation result is determined.

In another step 98, a duration of the delay is determined depending on the evaluation result.

In another step 100, the operation of the headlamp 24 is controlled depending on the duration of the delay and the first control signal.

In a final step 102 the method is ended or repeated.

What is claimed is:

1. A method of operating a headlamp of a motor vehicle configured to operate in at least two illumination states comprising:
   detecting at least one influencing variable, which influences a future change of a mode of the headlamp from one of the at least two illumination states into another of the at least two illumination states;
   detecting a time profile of the at least one influencing variable;
   generating a control signal operable to effect a change of the mode of the headlamp from a current illumination state of the at least two illumination states into another illumination state of the at least two illumination states with a signal generator;
   receiving the generated control signal with a controller;
   modifying the control signal with the controller to delay the change of the mode of the headlamp depending on the time profile of the influencing variable; and
   controlling the mode of the headlamp with the modified control signal.

2. The method according to claim 1, the modifying further comprising:
   preventing a start of the change of the mode for at least a first time period relative to a delay-free change of the mode to delay the change of the mode.

3. The method according to claim 1, the modifying further comprising:
   reducing a speed of the change of the mode relative to a rate of a delay-free change of the mode for at least a second time period to delay the change of the mode.

4. The method according to claim 1, further comprising:
   detecting a state variable of the headlamp as the at least one influencing variable.

5. The method according to claim 4, further comprising:
   detecting as the state variable a change of mode of the headlamp from one of the at least two illumination states to another of the at least two illumination states.

6. The method according to claim 4, further comprising:
   detecting as the state variable a duration of at least one of the at least two illumination states.

7. The method according to claim 1, further comprising:
   detecting at least one ambient measurement value for surroundings of the motor vehicle as the at least one influencing variable.

8. The method according to claim 7, further comprising:
   determining a probability for an appearance of another vehicle in a working range of the headlamp from the time profile of the ambient measurement value, wherein the ambient measurement value is based upon a detected corona effect, and
   modifying the control signal with the controller to delay the change of the mode of the headlamp comprises modifying the control signal based on the probability.

9. The method according to claim 1, wherein modifying the control signal comprises:
   modifying the control signal with the controller to delay the change of the mode of the headlamp depending on at least one of changes, durations, and frequencies of at least parts of the time profile of the at least one influencing variable.

10. The method of claim 8, further comprising:
    operating with the controller the headlamp in a low beam illumination state;
    detecting with an optical sensor an ambient light level corresponding to a light corona from another vehicle that is separated from the motor vehicle by an obstruction, the detected ambient light level being below a predetermined threshold to enable operation of the headlamp in a high beam illumination mode;
    modifying with the controller the control signal to delay a change in operational mode to the high beam illumination state with reference to the detected light corona from the other vehicle;
    detecting with the optical sensor the ambient light level from the other vehicle when the obstruction no longer separates the motor vehicle and the other vehicle; and
    generating with the controller the control signal to operate the headlamp in a high beam illumination state after expiration of the delay and after the ambient light level detected with the optical sensor drops below a predetermined threshold in response to the other vehicle passing the motor vehicle.

11. A control and evaluation system for operating a headlamp for a motor vehicle configured to operate in at least two illumination states, the control and evaluation system comprising:
    a sensor configured to sense at least one influencing variable that influences a future change of mode of the headlamp from one of the at least two illumination states to another of the at least two illumination states; and
    a controller operatively connected to the sensor, the controller having an input configured to receive, from a signal generator of the vehicle, a control signal operable to effect a change of a mode of the headlamp from a current illumination state of the at least two illumination states to another of the at least two illumination states, the controller having an output operably connected to the headlamp, the controller configured to (i) detect the at least one influencing variable with the sensor, (ii) determine a time profile of the at least one influencing variable, (iii) receive the control signal from the signal generator, (iv) modify the control signal to delay the change of the mode of the headlamp based on the determined time profile of the influencing variable, and (v) control the mode of the headlamp with the modified control signal.

12. A method of operating a headlamp of a motor vehicle, comprising:
  detecting a state variable of the headlamp over a non-instantaneous period of time;
  generating a time profile of the state variable over the non-instantaneous period of time;
  generating a control signal, which effects a change of a mode of the headlamp from a first illumination state to a second illumination state;
  delaying transmission of the generated control signal to the headlamp based upon the generated time profile; and
  controlling the headlamp using the generated control signal after delaying control of the headlamp.

13. The method of claim 12, wherein:
  generating the time profile comprises generating the time profile with a control and evaluation unit;
  generating the control signal comprises generating the control signal with a vehicle signal generator; and
  delaying transmission of the generated control signal to the headlamp comprises delaying transmission of the generated control signal to the headlamp with the control and evaluation unit.

14. The method of claim 13, further comprising:
  retrofitting the control and evaluation unit into the motor vehicle; and
  connecting the control an evaluation unit to the vehicle signal generator, wherein the vehicle signal generator is an original vehicle signal generator of the vehicle.

15. The method of claim 13, wherein detecting the state variable of the headlamp comprises:
  receiving an input from a sensor configured to detect at least one illumination state of the headlamp.

16. The method of claim 13, wherein the at least one illumination state of the headlamp consists of a full beam illumination mode.

17. The method of claim 13, further comprising:
  detecting at least one ambient measurement value associated with surroundings of the motor vehicle with a sensor; and
  delaying control of the headlamp using the generated control signal based upon the detected ambient measurement value.

18. The method of claim 17, wherein,
  the ambient measurement value is an ambient light level; and
  the ambient measurement value is based upon a detected corona effect.

19. The method of claim 17, wherein detecting at least one ambient measurement value comprises:
  detecting the at least one ambient measurement value using one or more of a radar sensor, and ultrasound sensor, and a Lidar sensor.

20. The method of claim 17, wherein detecting at least one ambient measurement value comprises:
  detecting the at least one ambient measurement value using an image sensor.

* * * * *